No. 791,643. PATENTED JUNE 6, 1905.
F. J. NOECHEL.
DISTRIBUTER MECHANISM FOR GRAIN DRILLS.
APPLICATION FILED DEC. 14, 1904.
2 SHEETS—SHEET 1.
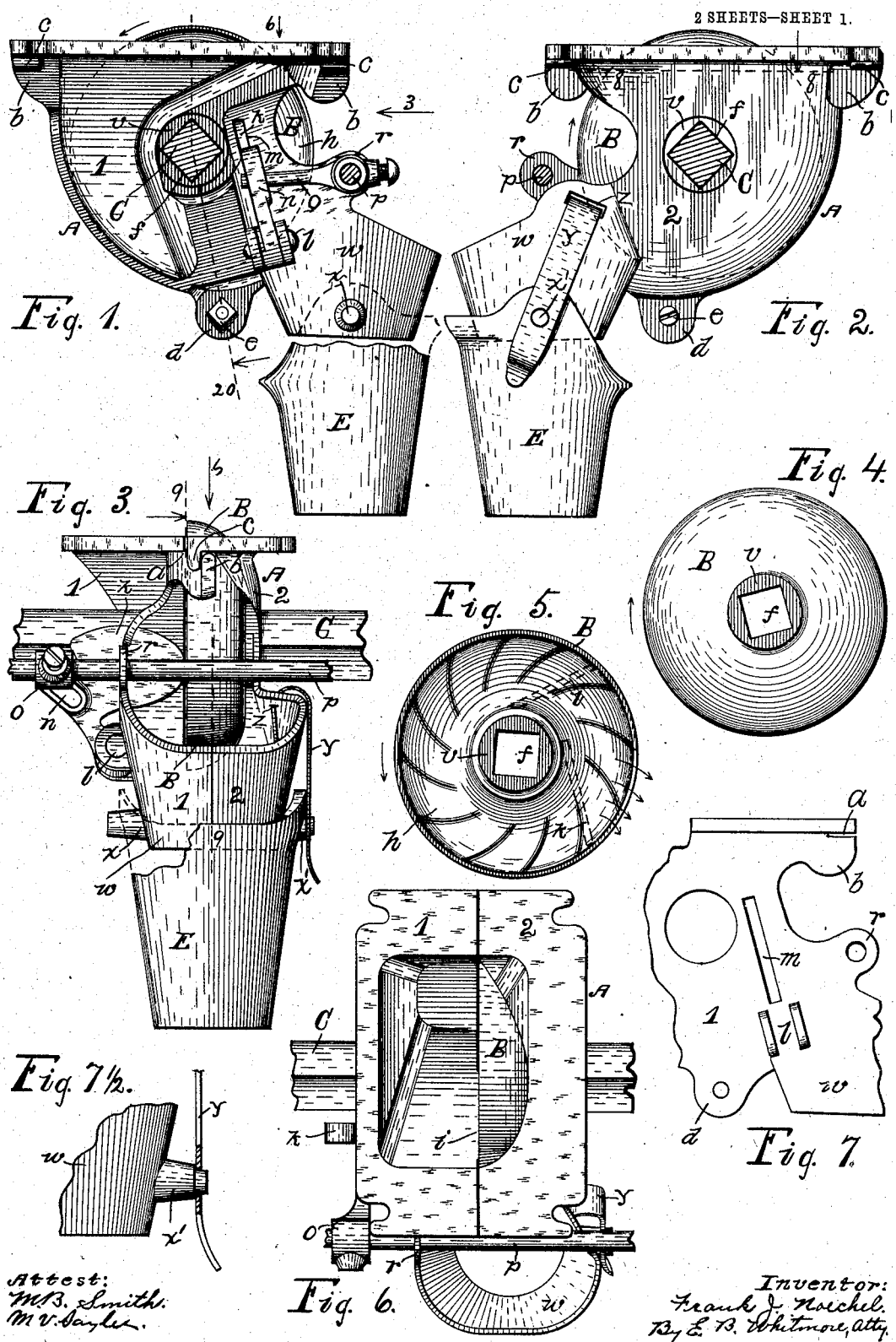
Attest:
M. B. Smith.
M. V. Sayler.
Inventor:
Frank J. Noechel.
By E. B. Whitmore, Atty.

No. 791,643. PATENTED JUNE 6, 1905.
F. J. NOECHEL.
DISTRIBUTER MECHANISM FOR GRAIN DRILLS.
APPLICATION FILED DEC. 14, 1904.
2 SHEETS—SHEET 2.
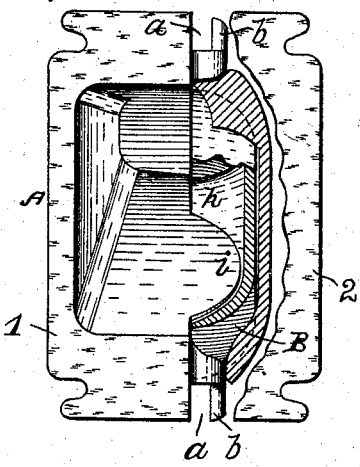
Fig. 8.
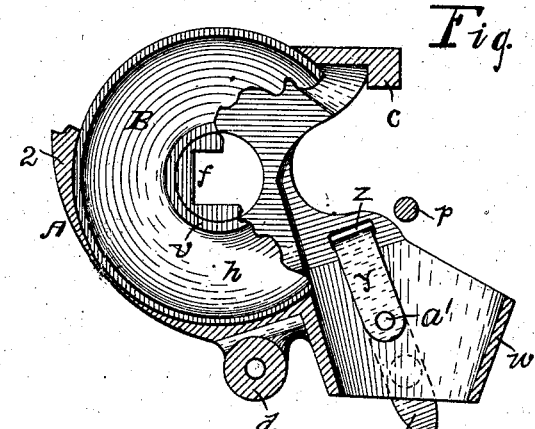
Fig. 9.
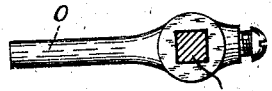
Fig. 12.
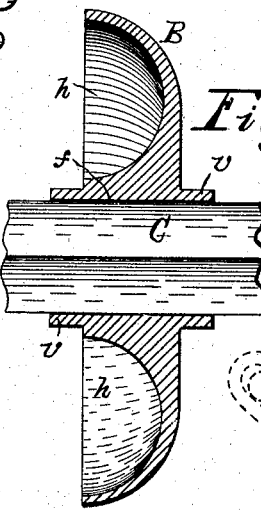
Fig. 10.
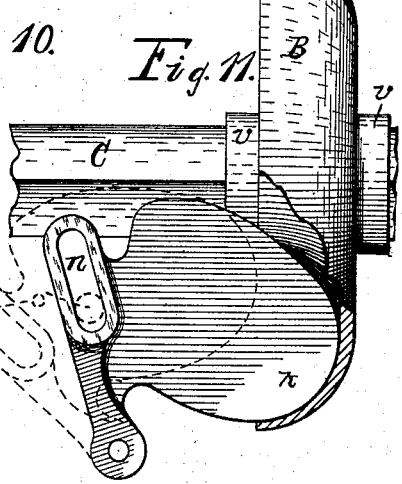
Fig. 11.
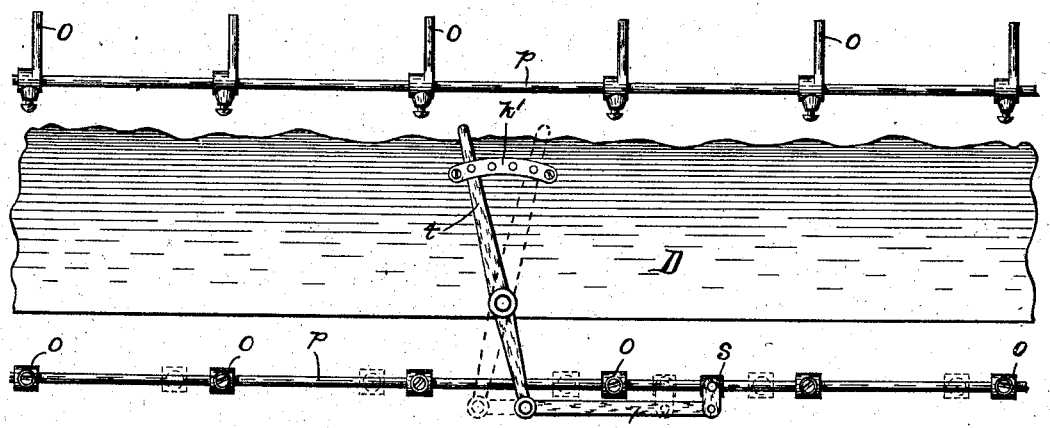
Fig. 13.
Fig. 14.
Attest:
M. B. Smith.
M. N. Sayles
Inventor:
Frank J. Noechel
By E. B. Whitmore, Atty.

No. 791,643.                                                                                  Patented June 6, 1905.

UNITED STATES PATENT OFFICE.

FRANK J. NOECHEL, OF ROCHESTER, NEW YORK.

DISTRIBUTER MECHANISM FOR GRAIN-DRILLS.

SPECIFICATION forming part of Letters Patent No. 791,643, dated June 6, 1905.

Application filed December 14, 1904. Serial No. 236,902.

*To all whom it may concern:*

Be it known that I, FRANK J. NOECHEL, of Rochester, in the county of Monroe and State of New York, have invented a new and useful Improvement in Distributer Mechanisms for Grain-Drills, which improvement is fully set forth in the following specification and shown in the accompanying drawings.

My invention is an improved distributer mechanism for grain-drills, the invention relating mainly to the matter of the construction of the distributer-shells and associated parts and the form of the distributer-wheels and the manner of regulating the flow of the seed to the ground.

One object of the invention is to produce a distributer-shell of improved construction and simpler form and one that is more cheaply constructed than heretofore.

Another object of the invention is to construct the distributer-wheels with better bearings than those heretofore used.

A further object of the invention is to provide better and improved means for regulating and controlling the outflow of the seed through the distributer-wheels.

A further object of the invention is to provide better means than heretofore employed to agitate the seed over the distributer-shells and stimulate the outflow of the seed from the seedbox.

Other objects and advantages of the invention will be brought out and made to appear in the following specification and the construction more particularly pointed out in the appended claims, reference being had to the accompanying drawings, which, with the reference characters marked thereon, form a part of this specification.

Figure 1 is a left side elevation of my improved distributer-shell, showing the parts in place, the shafts being transversely sectioned and a part broken away. Fig. 2 is a right side elevation of the shell and associated parts, the shafts being transversely sectioned. Fig. 3 is a rear view of the distributer-shell and associated parts seen as indicated by arrow 3 in Fig. 1, parts being broken away. Figs. 4 and 5 show, respectively, the outside and the inside of a form of the distributer-wheel. Fig. 6 is a plan of the distributer-shell and associated parts seen as indicated by arrow 6 in Fig. 1, parts being broken away. Fig. 7 shows in outline a portion of the left side of the shell seen as in Fig. 1, showing the slot for the shutter or cut-off for the distributer-wheel. Fig. 7½ is an elevation of a part of the distributer-shell, further showing the form of the parts, the spring-holder being in part longitudinally sectioned. Fig. 8 is a plan with a part of the shell horizontally sectioned on the dotted line 8 8 in Fig. 2, parts being broken away and omitted. Fig. 9 is a vertical section of the distributer-shell on the broken dotted line 9 9 in Fig. 3, parts being broken away. Fig. 10 is a diametrical section of one form of a distributer-wheel, showing a part of the shaft carrying the wheel. Fig. 11 is a side elevation of a distributer-wheel and associated parts detached, further showing the relation of the parts, parts being broken away and the shutter shown in two positions by full and by dotted lines. Fig. 12 is a side elevation of a controlling-finger, showing the finger-shaft in vertical cross-section. Fig. 13 is a plan of a part of the finger-shaft with a series of fingers in place thereon. Fig. 14 is a rear elevation of a part of the seedbox, showing in elevation a part of the associated finger-shaft and means for operating it. Figs. 7½ and 10 to 14, inclusive, are drawn to various scales, both larger and smaller than that of the remaining figures.

In the drawings, A is a distributer-shell, and B a vertical distributer-wheel held therein. The shell A is formed in two hollow interlocking sections or main parts 1 2, joined to form a single hollow body or inclosure for holding the distributer-wheel B and for receiving and passing the seed-grain. The part 1 is formed near its upper side with a pair of offset portions or hooks *b b*, forward and rear, Figs. 1, 2, 3, and 8, with openings *a a*, and the part 2 is formed with downwardly-projecting lips *c c* in position to enter and occupy the spaces *a a*, as shown in Fig. 3, when the parts 1 2 of the shell are put together. The two main parts of the shell are further formed with perforated downward projections or ears $d\ d$, Figs. 1, 2, 7, and 9, side by side when the parts are together for receiving a simple removable fastener or holder, as a screw or rivet $e$, which, with the interlocking parts $b\ c$, serves to hold the parts 1 2 of the shell securely together, as stated.

The distributer-wheels B, I prefer to form with two oppositely-projecting cylindrical hubs $v\ v$, Figs. 1, 2, 4, 5, 9, 10, and 11, resting in corresponding circular bearings in the main parts 1 2 of the shells A, this construction enabling the wheels to run evenly and smoothly in the shells and with minimum friction.

The distributer-wheels B are each formed with an annular concentric space or hollow $h$ for receiving and passing the seed and also with central openings $f$, Figs. 4 and 5, through which to pass a revolving shaft C for turning them in the respective shells A. The openings $f$ are preferably made square in form, as shown, to receive a shaft C of square cross-section, though I do not wish to confine myself to this particular form of opening and shaft, as any other polygonal form would as well answer the purpose. The shaft, whatever its form, fits loosely in the wheels, so as not to cause them to cramp or bind in their bearings in the shells, merely acting to turn the wheels in the shells.

The grain or seed to be planted is held in the usual manner in a box D, Fig. 14, the distributer-shells A being secured to the under side of the box in line and equally spaced and in regular order, as shown in Letters Patent No. 676,076, June 11, 1901, and No. 694,069, February 25, 1902. Openings are formed through the bottom of the box over the respective shells and communicating with the interiors thereof, through which the seed flows into the shells, it passing thence into and along the spaces $h$ of the hollow wheels B on its way toward the ground. The part 1 of the shell is formed with an inclined partition $i$, Figs. 6 and 8, (shown also by dotted lines in Fig. 5,) projecting into and cutting obliquely across the circular cavity $h$ of the distributer-wheel and closing it against any backward movement of the seed therein or against any of the seed being carried around over the upper side of the revolving wheel.

A tongue or shutter $k$, Figs. 1, 3, and 11, also represented by dotted lines in Fig. 5, is provided for each distributer-wheel for controlling the flow of the seed through the wheel. Each shutter is held pivotally at $l$ to the outside of the shell A in position to project through the side of the shell into the hollow $h$ of the distributer-wheel B, as shown. This shutter occupies and projects through a slot $m$, Fig. 7, in the part 1 of the shell, being adapted to wholly close the passage through the hollow $h$ for the seed in the distributer-wheel, as shown by full lines in Fig. 11, or partially close the passage or be withdrawn wholly from the opening $h$, as appears by dotted lines in the figure and by full lines in Fig. 3. Each shutter is formed with a slotted part $n$, Figs. 1, 3, and 11, into which projects the end of a finger $o$, Figs. 1, 3, 6, 12, 13, and 14, secured adjustably, as by a set-screw, to a slender horizontal rod $p$, resting in eyelets or bearings $r$ on the series of shells A. The rod $p$ may be round, as shown in Figs. 1 and 3, or square, as appears in Fig. 12, or of other form of cross-section, this being only a matter of convenience in construction. This rod has no rotatory motion on its axis, but it is moved longitudinally one way and the other through its bearings in the series of shells A by some convenient means, as a hand-lever $t$, Fig. 14, held pivotally to the rear side of the seedbox D. A block or body $s$ is made rigid on the rod $p$ and connected pivotally with the lower end of the lever $t$ by a connecting strap or bar $u$, by means of which the rod may be moved by the lever longitudinally, as stated. These movements of the rod serve to adjust the series of shutters in positions in the cavities $h$ of the distributer-wheels, and so regulate and control the flow of the seed through them into the parts below. The lever $t$ is held and controlled by some simple means, as a confining-bar $k'$, Fig. 14, secured to the seedbox, said confining-bar and the lever being pierced to receive a pin to hold the lever in any one of several positions of adjustment. By this means the shutters may be in any case adjusted and held to allow the seed to pass the wheels in quantities as desired. The seed enters the hollows or cavities $h$ of the distributer-wheels above and forward of the slanting partitions $i$, (see Figs. 5, 6, and 8,) and it can only escape from the wheels into the conical parts $w$ of the shells after it passes the respective shutters $k$, as indicated by arrows in Fig. 5. This system of hollow distributer-wheels and the coacting shutters, with the means for actuating and controlling them, takes the place of costly and cumbersome speed devices heretofore used and renders them unnecessary, while with the wheels and shutters the work of seeding the ground is equally well done.

The part $w$ of each distributer-shell A is formed with oppositely-projecting unequal studs $x\ x'$, Figs. 1, 2, and 3, upon which to hang a funnel E, into which the seed descends from the shell A on its way to the ground. The funnel has openings through its opposite sides near its upper end through which to receive the studs, the funnel when in place on the shell hanging loosely thereon. In putting the funnel to place it is first inclined and passed upon the long stud $x$, Fig. 3, and then moved toward the right and brought to a vertical position with the opening in the opposite side opposite the short stud $x'$. A slight movement of the funnel now toward the left will cause it to pass onto said short stud and pend from both, as shown, it not being able to escape from the long stud $x$. A spring $y$, Figs. 2, 3, 6, and 9, held by the shell A, presses the end of the stud $x'$ and serves to prevent the funnel from moving laterally off of said stud and becoming thereby detached from the shell and displaced. The extreme end of the short stud $x'$ is reduced in diameter, as shown in Fig. 7½, the spring $y$ being perforated to pass upon the reduced end of the stud, as shown, which prevents any lateral swinging or side motion of the spring. This spring bends through an opening $z$ in the side of the shell, having its lower inner end pierced and passed upon a pin or small stud $a'$, Fig. 9, projecting horizontally inwardly from the adjacent wall of the part $w$ of the shell. This simple spring is readily put in place upon the shell or removed therefrom, it being complete in itself and having no removable screws or other holding parts or devices to keep it in place and to be primarily loosened or detached in order to remove the spring, its short end or branch being simply passed through the openings $z$ in the shell and sprung upon the stud $a'$, as stated.

What I claim as my invention, and desire to secure by Letters Patent, is—

1. A distributer mechanism for grain-drills, comprising a hollow shell consisting of two main parts or sections joined to form an inclosure, said sections having mutually-interlocking parts, and a single removable holding element for the sections, a hollow rotary distributer-shell within the inclosure of the shell and a shutter crossing the hollow of the shell.

2. A distributer mechanism for grain-drills, comprising a hollow shell consisting of two main parts or sections joined to form an inclosure, a hollow rotatory distributer-wheel within the inclosure of the shell, and a shutter crossing the hollow of the wheel, and means to adjust the shutter in said space.

3. A distributer mechanism for grain-drills, comprising a body consisting of two main hollow parts or sections joined to form an inclosure, a wheel with an annular cavity or hollow within the shell, and a shutter held without the shell and piercing the wall of the shell and projecting into the cavity or hollow of the wheel, and means to move the shutter and for holding it in positions of adjustment.

4. A distributer mechanism for grain-drills, comprising a body consisting of two main parts of portions joined to form a hollow shell, a hollow wheel within the shell and adapted to turn in bearings therein, a shutter held by the shell to occupy the hollow of the wheel, a non-rotating shaft held to move longitudinally in a bearing of the shell, a finger carried by said shaft to engage the shutter, and means for moving the shaft.

5. A distributer mechanism for grain-drills, comprising a seedbox, a hollow distributer-shell secured beneath the seedbox and consisting of a body comprising two parts or sections joined to form an inclosure, a hollow rotatory wheel within the shell for conveying the seed, and means for controlling the flow of seed through the wheel, the latter projecting above the shell, uncovered, and into the seedbox to agitate and loosen the seed.

6. A distributer mechanism for grain-drills, comprising a distributer-shell having projections at its sides, and a funnel held by said projections, and a spring-holder supported by the shell with one end passed through openings in the shell and the other end disposed outside thereof to hold the funnel in place on the shell.

7. A distributer mechanism for grain-drills, comprising a hollow distributer-shell having an opening through its side and an inwardly-projecting pin, a funnel pending from said shell, and a perforated spring for controlling the funnel, the spring occupying said opening in the shell and holding upon said inwardly-projecting pin of the shell.

8. A distributer mechanism for grain-drills, comprising in combination with a seedbox, a series of hollow distributer-shells secured to the seedbox and each consisting of a body comprising two parts or sections detachably joined, openings in the seedbox communicating with the interiors of the distributer-shells, hollow distributer-wheels in the distributer-shells, a rotatory shaft piercing the distributer-wheels, a series of shutters to occupy the hollows of the distributer-wheels, and means for adjusting and holding said shutters.

9. A distributer mechanism for grain-drills, comprising a distributer-shell having projections at its sides, and a detachable funnel pending from said projections, and a single removable spring-holding element for the funnel having one end detachably held within the shell.

10. A distributer mechanism for grain-drills, comprising a distributer-shell having projections at its sides, one of said projections having a reduced part, and an element pending from said projections, and a perforated spring for controlling said pending element occupying said reduced part of the stud with one end passed through openings in the shell and holding against a stud therein.

In witness whereof I have hereunto set my hand, this 5th day of December, 1904, in the presence of two subscribing witnesses.

FRANK J. NOECHEL.

Witnesses:
ENOS B. WHITMORE,
MINNIE SMITH.